Patented Apr. 6, 1926.

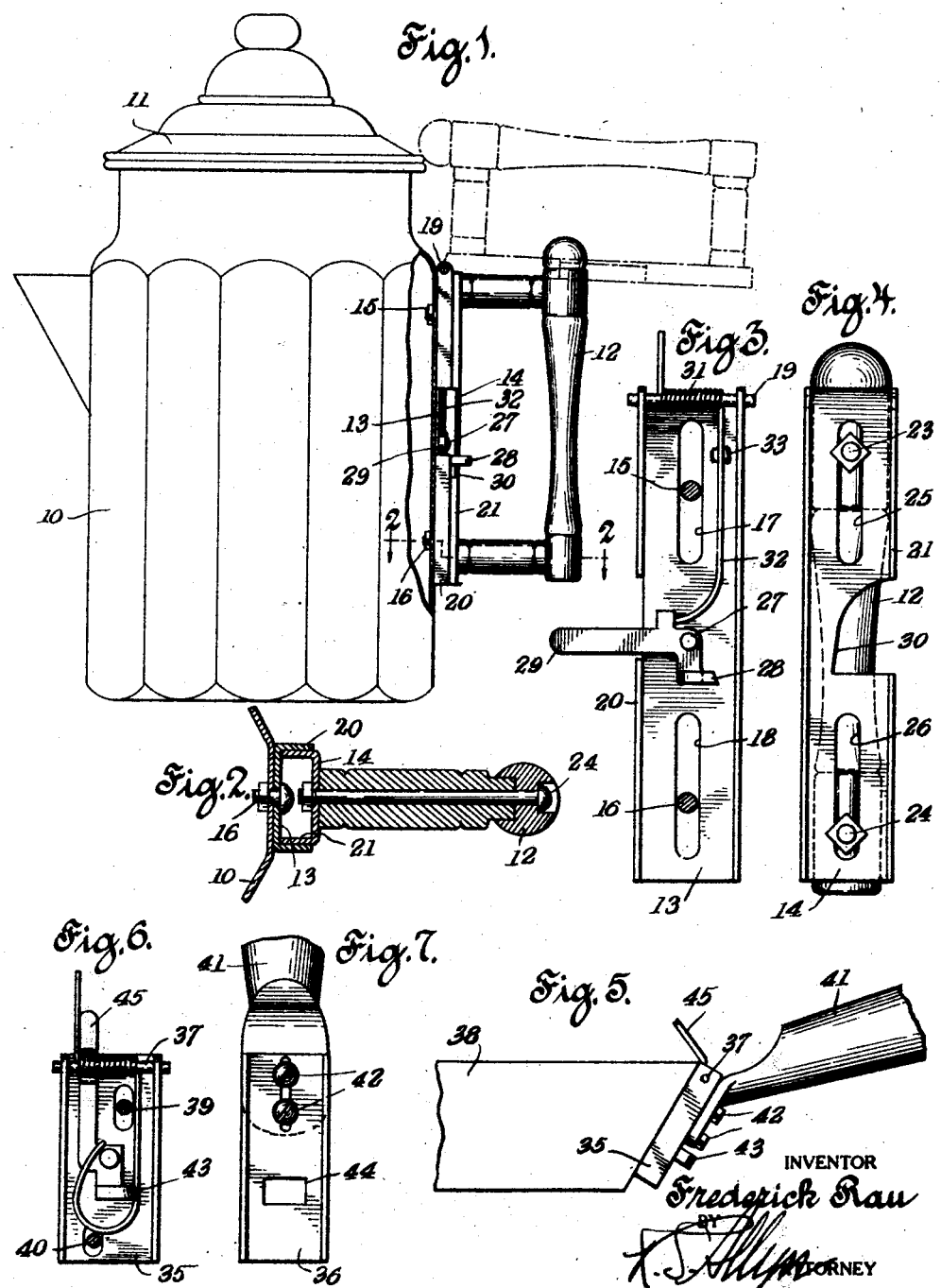

1,579,489

UNITED STATES PATENT OFFICE.

FREDERICK RAU, OF LAKESIDE TOWN, COLORADO.

HANDLE FOR POTS AND KETTLES.

Application filed April 18, 1924. Serial No. 707,323.

*To all whom it may concern:*

Be it known that I, FREDERICK RAU, a citizen of the United States of America, residing at Lakeside Town, Jefferson County, State of Colorado, have invented a new and useful Handle for Pots and Kettles, of which the following is a specification.

My present invention is an improvement upon that type of construction of my former application, No. 633,035, filed April 18, 1923.

One object of my invention is to provide a construction which can be secured to various styles and designs of coffee pots, tea pots, and the like.

Another object is to provide a construction to provide means by which various handles may be attached to a pot.

Another object is to provide a tilting handle having more secure means of attachment.

In its preferred form, the attachment consists of two parts which are hinged together and normally held in position by a spring pressed latch. One of these parts is provided with means for attaching it to various sizes and shapes of pots, and the other part is provided with means of attachment to various sizes of handles. These two parts of the attachment are provided with interfitting flanges so as to give greater stability and security.

Figure 1 is a side view of a coffee pot provided with a handle construction embodying my invention, part of the pot being broken away and shown in section where the handle is attached.

Figure 2 is a horizontal sectional view on the plane of the line 2—2 of Figure 1, but on a larger scale.

Figures 3 and 4 are inside views of the two parts of the handle attachment, separated.

Figure 5 is a side view of a modification showing a handle attached to a pan.

Figures 6 and 7 show the two parts of the handle attachment of Figure 5.

The pot 10 may be of any suitable design and for any purpose. It may also have a cover 11 of any suitable design secured in any suitable manner.

The handle 12 may be of any suitable design as herein shown or as shown in my former application, or otherwise.

The handle attachment has two parts, 13 and 14, the one being secured to the pot and the other to the handle. In this particular form, bolts 15 and 16 are employed for securing the part 13 to the pot. The part 13 may be provided with slots 17 and 18 so as to permit the part 13 to be attached to various sizes of pots or pots having various different spacings of holes for bolts 15 and 16. These slots 17 and 18 also permit of vertical adjustment of the part 13 so as to permit the handle to be secured at various different heights with respect to the body and cover of the pot. The pin 19 provides a pivotal support for the part 14 of the attachment and may have its outer ends upset or bent over in any suitable manner to secure the parts permanently together. The two parts of the attachment are preferably provided with flanges 20 and 21 which fit together as shown in Figure 2 so as to provide greater lateral stability to the handle.

The part 14 is secured to the handle, for instance, by bolts 23 and 24. To accommodate different sizes of handles and also to permit of vertical adjustment of the handle with respect to the part 14, I may provide the part 14 with slots 25 and 26, as shown in Figure 4.

To hold the parts of the attachment together, I prefer to provide a latch hinged at 27 to the part 13 and having a beveled nose 28 and handle 29. The other part 14 is provided with shoulder 30 to receive the nose 28 when the parts are in position shown in Figures 1 and 2. To release the latch, the handle 29 is raised so as to dis-engage the nose 28 from the shoulder 30. This permits the spring 31 to raise the handle into the dot and dash position of Figure 1. The same spring may have an extension 32, engaging the latch to hold it yieldingly in position. This spring 32 may be positioned near its upper end by shoulders 33, formed in the metal of the part 13.

In the construction shown in Figures 5, 6, and 7, the attachment consists of the two parts 35 and 36 hinged together by the pin 37. Part 35 is secured to the pan 38 by bolts 39 and 40. The part 36 is secured to the handle 41 by screws 42. The latch 43 is adapted to engage one edge of the opening 44 in the part 36 and is adapted to be operated by the handle, or fingerpiece, 45.

It should be understood that I contemplate that other changes and modifications may be made within the scope of my claims, except as limited by the terms thereof.

I claim:

1. A construction of the character described, comprising two members hinged together at the top, means for securing one member to a pot or the like and means for securing the handle to the other member in various vertical adjusted relations.

2. In a construction of the character described, a support, a member hinged thereto, a latch to hold said member with reference to said support, a handle, and vertically adjustable means for securing said handle to said support independently of said latch.

3. In a construction of the character described, two attachment members hinged together at their upper ends, means for securing one of said members to a cooking utensil, inter-fitting means at the lower ends of said members to prevent their relative lateral displacement, a manually releasable latch for holding said members together against a relative swinging movement, and a handle secured to the other of said members.

FREDERICK RAU.